(12) United States Patent
Gonzalez et al.

(10) Patent No.: US 9,476,473 B2
(45) Date of Patent: Oct. 25, 2016

(54) BRAKE ACTUATOR FOR AN AIRCRAFT WHEEL HYDRAULIC BRAKE

(71) Applicant: MESSIER-BUGATTI-DOWTY, Velizy Villacoublay (FR)

(72) Inventors: Vincent Gonzalez, Velizy-Villacoublay (FR); Jacques Bussiere, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 0 days.

(21) Appl. No.: 14/645,792

(22) Filed: Mar. 12, 2015

(65) Prior Publication Data

US 2015/0275992 A1    Oct. 1, 2015

(30) Foreign Application Priority Data

Apr. 1, 2014 (FR) ...................... 14 52887

(51) Int. Cl.
| | |
|---|---|
| F16D 65/38 | (2006.01) |
| F16D 65/58 | (2006.01) |
| F16D 55/24 | (2006.01) |
| B64C 25/44 | (2006.01) |
| B64C 25/42 | (2006.01) |
| F16D 65/54 | (2006.01) |
| F16D 55/40 | (2006.01) |
| F16D 65/18 | (2006.01) |
| F16D 121/04 | (2012.01) |

(52) U.S. Cl.
CPC .............. *F16D 65/58* (2013.01); *B64C 25/42* (2013.01); *B64C 25/44* (2013.01); *F16D 55/24* (2013.01); *F16D 55/40* (2013.01); *F16D 65/186* (2013.01); *F16D 65/543* (2013.01); *F16D 2121/04* (2013.01)

(58) Field of Classification Search
CPC ........ F16D 55/40; F16D 65/20; F16D 65/38; F16D 65/40; F16D 65/54; F16D 65/55; F16D 65/543

USPC .......................... 188/71.8, 196 R; 192/111.1
See application file for complete search history.

(56) References Cited

U.S. PATENT DOCUMENTS 3,903,999 A    9/1975  Ditlinger
3,990,547 A *  11/1976 Plaat ..................... F16D 65/543
                                                       188/196 R (Continued)

FOREIGN PATENT DOCUMENTS

| EP | 0555819 A1 | 8/1993 |
|---|---|---|
| GB | 2017844 A | 10/1979 |
| WO | 2005/019679 A1 | 3/2005 |

OTHER PUBLICATIONS

French Search Report of FR 1452887, Nov. 17, 2014.

*Primary Examiner* — Christopher Schwartz
(74) *Attorney, Agent, or Firm* — Sughrue Mion, PLLC

(57) ABSTRACT

A brake actuator comprising a sleeve (1), a piston (3) sealingly slidably mounted in the sleeve to apply a braking force, the piston being provided with an internal cage (21), and a wear compensating device (10) which defines a retracted position of the piston in the sleeve by means of an axially mobile stop which is able to be moved forward by the piston during the application of a braking force and/in frictional relationship with a fixed part (12) of the wear compensating device attached to the sleeve. The mobile stop comprises a radially deformable bushing (16) which cooperates with an olive (15) which is attached to a distal end of the fixed part of the wear compensating device. The bushing comprises means for guiding its proximal end (17) against an internal face of the internal cage (21).

4 Claims, 2 Drawing Sheets

(56) References Cited

U.S. PATENT DOCUMENTS

| | | | |
|---|---|---|---|
| 4,180,147 A * | 12/1979 | Tjarksen | F16D 65/543 |
| | | | 188/196 P |
| 4,503,950 A | 3/1985 | Anderson | |
| 4,815,359 A | 3/1989 | Black | |
| 5,219,046 A * | 6/1993 | Clark | F16D 55/40 |
| | | | 188/196 P |
| 7,344,006 B2 * | 3/2008 | Edmisten | F16D 55/36 |
| | | | 188/206 R |

\* cited by examiner

BRAKE ACTUATOR FOR AN AIRCRAFT WHEEL HYDRAULIC BRAKE

TECHNICAL BACKGROUND TO THE INVENTION

Hydraulic brakes used to brake the wheels of air-craft generally comprise a ring having multiple cavities in which brake actuators are connected in a removable manner. Each of the actuators comprises a sleeve which is sealingly connected in one of the cavities of the ring and in which a piston is sealingly slidably mounted along a sliding axis.

The ring distributes pressurized hydraulic fluid into all of its cavities, a fluid which acts on the piston to cause it to be extended and to apply a braking force on the friction elements extending opposite the ring, including rotors which rotate with the wheel and stators which are fixed in terms of rotation.

The piston generally has an operational path which it follows during the application of a braking force. This operational path, in the order of several millimeters, is sufficient to permit the application of the braking force on the friction elements, and the return of the piston so as to permit the free rotation of the rotors. To this end, a spring extending inside the piston ensures the return of the piston as far as a retracted position when the braking force is no longer applied.

However, as the friction elements are progressively worn as a result of the repeated action of braking forces, it is important that the piston is always located in the vicinity of the friction elements. To achieve this, it is known to provide the brake actuators with a wear compensating device which extends inside the piston.

Wear compensating devices are known, said wear compensating devices comprising a mobile stop which is slidably mounted with friction along the sliding axis on a central rod extending in the piston and which defines the retracted position of the piston. During the application of a braking force, the piston is pushed toward the friction elements and in this case drives the mobile stop therewith, overcoming the friction between the rod and the stop which causes the mobile stop to move forward on the rod. When the force is released, the spring returns the piston to the new retracted position which has moved forward due to the advance of the mobile stop relative to the rod.

The friction may be distributed as follows: the mobile stop comprises a radially deformable bushing which cooperates at one distal end with an olive attached to a distal end of the central rod so as to be deformed by said olive.

However, the mobile stop tends to move around the olive during the displacement thereof along the sliding axis. The proximal end of said mobile stop then rubs against the central rod which may cause the formation of undesirable grooves on the central rod. More specifically, the proximal end of the piston is partially guided by the central rod of the wear compensating device, a seal being borne by the piston so as to extend between the central rod and the proximal end of the piston. Thus, during the displacements of the piston along the sliding axis, the seal regularly rubs against said grooves which ultimately causes a deterioration of the seal which impairs the sealed state of the actuator.

SUBJECT OF THE INVENTION

The subject of the invention is to propose a brake actuator for an aircraft wheel hydraulic brake which does not comprise the aforementioned drawback.

DESCRIPTION OF THE INVENTION

In order to achieve this object, the invention proposes a brake actuator for an aircraft wheel hydraulic brake, designed to be received in one of the cavities of a ring of the brake, the actuator comprising
- a sleeve capable of being sealingly received in the cavity of the ring;
- a piston sealingly slidably mounted in the sleeve along a sliding axis to apply a braking force when a pressurized fluid is introduced into the cavity, the piston being provided with an internal cage;
- a wear compensating device which defines, with the internal cage, a retracted position of the piston in the sleeve by means of an axially mobile stop which is able to be moved forward by the internal cage during the application of a braking force and relative to frictional contact with a fixed part of the wear compensating device attached to the sleeve, the mobile stop comprising a radially deformable bushing which cooperates with an olive so as to be deformed by said olive which is attached to a distal end of the fixed part of the wear compensating device; and
- a resilient member for returning the piston to the retracted position defined by the bearing of the piston against the internal cage, the internal cage in turn bearing against the bushing.

According to the invention, the bushing comprises means for guiding its proximal end against an internal face of the internal cage.

Thus the bushing is guided both in the region of its internal wall in contact with the olive and in the region of its proximal end in contact with the internal cage. This limits the movement of the bushing around the olive, in particular at the start of the cycle when the bushing is not yet deformed and the olive is in contact with the distal end of the bushing.

In this manner, the formation of undesirable grooves on the fixed part of the wear compensating device is avoided during the displacement of the bushing along the sliding axis.

For the present application, "proximal end" is understood as the end closest to the bottom of the cavity of the ring associated with the actuator under consideration, and thus "distal end" is understood as the end closest to the brake.

BRIEF DESCRIPTION OF THE FIGURES

The invention will be understood more clearly by reading the following description with reference to the figures of the accompanying drawings, in which.

DETAILED DESCRIPTION OF THE INVENTION

Figure 1:
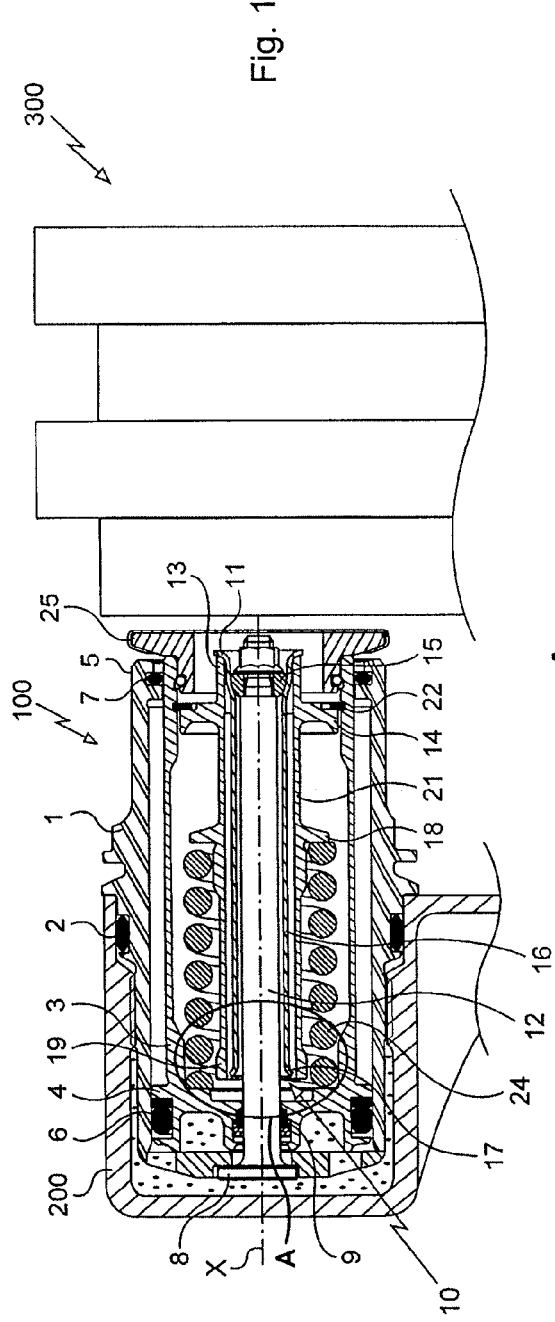
FIG. 1 is a sectional view of a brake actuator according to the invention illustrated in position in a ring of an aircraft hydraulic brake.

With reference to FIG. 1, the brake actuator 100 of the invention is designed to be received in one of the cavities 200 of a ring of an aircraft hydraulic brake, also comprising friction elements 300 comprising a succession of rotor discs and stator discs, for example carbon discs, on which the actuator selectively exerts a braking force during the intake of pressurized fluid (illustrated by dots) in the cavity 200.

The actuator 100 firstly comprises a generally cylindrical sleeve 1 which is sealingly received in the cavity 200 of the ring. To this end, a seal 2 cooperates with an external face of the sleeve to contain the hydraulic fluid in the cavity 200.

A piston 3 is slidably mounted in the sleeve 1 along a sliding axis X. To this end, the distal end 5 of the sleeve 1 is shaped as a bearing to guide the piston 3. The distal end 5 of the sleeve 1 is provided with a scraper 7. Moreover, the proximal end 4 is shaped on its external face as a bearing which extends so as to fit against an internal face of the sleeve 1. The proximal end of the piston 1 is thus provided with a first seal 6 arranged between the internal face of the sleeve 1 and the external face of the proximal end 4 of the piston 3.

Moreover, the distal end of the piston 3 bears a shoe 25 designed to bear against the friction elements 300 during operation.

Moreover, the piston 3 is provided with an internal cage 21 which is stopped by the piston 3 by means of a stop segment 22 attached to the piston 3. The internal case 21 thus has on its external wall a first step 14 capable of cooperating with said stop segment 22. The internal cage also has a second step 18 capable of cooperating with a spring 24 extending between said second step 18 and the proximal end 4 of the piston 3.

The actuator 100 is also provided with a wear compensating device 10.

The wear compensating device 10 comprises a fixed part attached to the sleeve 1. The fixed part here comprises a central rod 12, one proximal end 8 thereof being attached to the sleeve 1. The central rod 12 is arranged such that the piston 3 and the internal cage 21 extend around the central rod 12. More specifically, the proximal end 4 of the piston 3 is shaped on its internal face as a bearing which extends so as to fit against the central rod 12. The proximal end 4 of the piston 3 thus comprises a second seal 9 arranged between the central rod 12 and the piston 3. In this manner, the central rod 12 also permits the sliding of the piston 3 in the sleeve 1 to be guided along the sliding axis X.

Moreover, the distal end of the central rod 12 bears an olive 15 having an external spherical surface.

The wear compensating device also comprises a mobile stop which comprises a deformable bushing 16 extending around the central rod 12 between said central rod 12 and the internal cage 21.

The olive 15 is of a diameter greater than an internal diameter of the bushing 16, such that the displacement of the olive 15 in the bushing 16 causes the radial deformation of the bushing 16 which generates a frictional force sufficient to retain the bushing in position on the olive 15, in the absence of external actuation. Moreover, due to the radial deformation of the bushing 16, the deformed part of the bushing 16 comes to bear against the internal face of the internal cage 21 which also generates a frictional force which is sufficient to retain the internal cage 21 in position on the bushing 16, and thus on the olive 15, in the absence of internal actuation.

The distal end of the bushing 16 also comprises a flange 11, forming a stop against which the distal end 13 of the internal cage 21 comes to bear during the application of a braking force.

Figure 4:
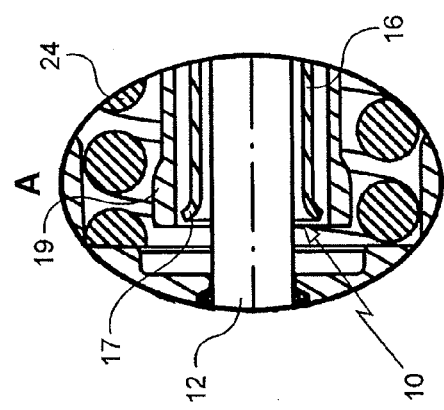
FIG. 4 is an enlarged view of the detail A illustrated in FIG. 1, an exaggerated space having been illustrated between the cage and the bushing.

According to the invention and as is more visible in FIG. 4, the proximal end 17 of the bushing 16 is shaped so as to be widened radially in the direction of the internal face of the internal cage 21. The proximal end 17 is thus curved in the direction of the internal face of the internal cage 21. In this manner, the proximal end 17 extends so as to fit against the internal face of the internal cage 21 and thus forms means for guiding the proximal end 17 against the internal face of the internal cage 21 (the space between the proximal end 17 and the internal cage being shown here in an exaggerated manner so as to facilitate the understanding of the invention).

The bushing 16 is thus guided at its proximal end by the internal cage 21 and at its distal end, when the bushing 16 is not deformed or only slightly deformed, by the olive 15.

In the resting position, the spring 24 pushes back the piston 3 to the retracted position illustrated in FIG. 1, defined by the bearing of the stop segment 22 against the first step 14 of the internal cage 21.

The operation of the brake actuator of the invention is as follows. Starting from the retracted position illustrated in FIG. 1, a braking force is applied by admitting pressurized fluid into the cavity 200. The fluid pushes back the piston 3 toward the discs 300. If the proximal end 4 of the piston 3 comes into abutment against the proximal end 19 of the internal cage 21 before the shoe 25 touches the discs 300, the distal end 13 of the internal cage 21 is moved forward by the piston 3 and comes to bear against the flange 11 of the bushing 16 which causes a simultaneous displacement of the internal cage 21 and of the bushing 16 along the sliding axis X.

Figure 2:
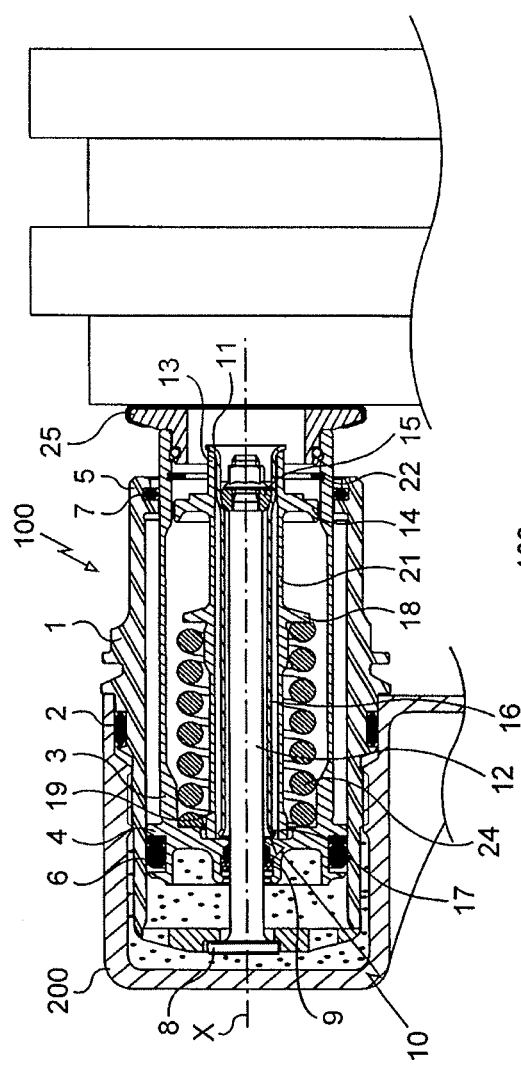
FIG. 2 is a figure similar to FIG. 1, the actuator being illustrated during the application of a braking force.

The bushing 16 is thus moved forward by means of the internal cage 21, by the piston 3 encountering the friction generated by the radial deformation which is imposed by the olive 15 on the bushing 16, until the shoe 25 comes into contact with the discs 300, as illustrated in FIG. 2.

Figure 3:
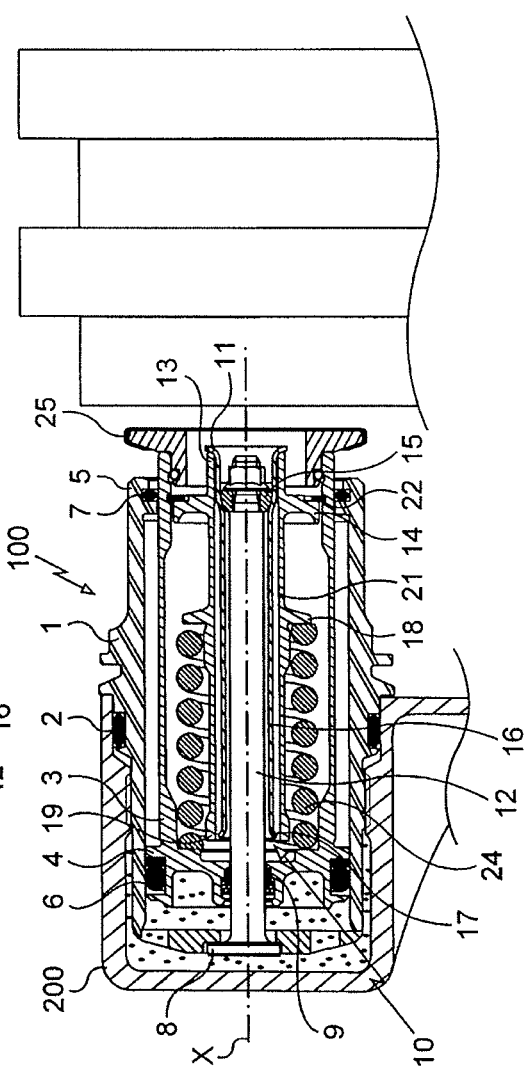
FIG. 3 is a figure similar to FIG. 2, the actuator being illustrated after the release of the braking force.

Then, when the braking force is released, the piston 3 returns under the action of the spring 24 until the stop segment 22 comes into abutment against the first step 14 of the internal cage 21, thus defining a new retracted position which is further forward relative to the previous position, as illustrated in FIG. 3. The operational path of the piston (between the position of FIG. 2 and the position of FIG. 3) is unchanged, only the retracted position having moved slightly forward to compensate for the wear of the discs 300.

The invention is not limited to the above description but nevertheless encompasses all variants which come within the scope of the invention defined by the claims.

The invention claimed is:

1. A brake actuator for an aircraft wheel hydraulic brake, designed to be received in one of the cavities (200) of a ring of the brake, the actuator comprising
a sleeve (1) capable of being sealingly received in the cavity of the ring;
a piston (3) sealingly slidably mounted in the sleeve along a sliding axis (X) to apply a braking force when a pressurized fluid is introduced into the cavity, the piston being provided with an internal cage (21);
a wear compensating device (10) which defines, with the internal cage, a retracted position of the piston in the sleeve by means of an axially mobile stop which is able to be moved forward by the internal cage during the application of a braking force and/in frictional relationship with a fixed part (12) of the wear compensating device attached to the sleeve, the mobile stop comprising a radially deformable bushing (16) which cooperates with an olive (15) so as to be deformed by said olive which is attached to a distal end of the fixed part of the wear compensating device, a distal end of the internal cage (21) coming into abutment with the distal end of the bushing (16) when a braking force is applied; and a resilient member (24) for returning the piston to the retracted position defined by the bearing of the piston against the internal cage, the internal cage in turn bearing against the bushing;

wherein the bushing (16) comprises guiding means for guiding the bushing's proximal end (17) against an internal face of the internal cage (21), the bushing being guided both in the region of its internal wall in contact with the olive (15) and in the region of its proximal end in contact with the internal cage (21).

2. The brake actuator according to claim 1, in which the proximal end (17) of the bushing (16) is shaped so as to be widened radially in the direction of the internal face of the internal cage (21) in order to extend so as to fit against said internal face.

3. A hydraulic brake for an aircraft wheel comprising at least one brake actuator according to claim 2.

4. A hydraulic brake for an aircraft wheel comprising at least one brake actuator according to claim 1.

\* \* \* \* \*